United States Patent [19]

Millot et al.

[11] Patent Number: 4,609,521
[45] Date of Patent: Sep. 2, 1986

[54] COMPLEMENTARY SHUTDOWN DEVICE FOR AN UNDERMODERATED NUCLEAR REACTOR

[75] Inventors: Jean-Paul Millot, Elancourt; Patrice Alibran, Paris; Guy Desfontaines, Puteaux; Dominique Hittner, Paris, all of France

[73] Assignee: Framatome & Cie, Courbevoie, France

[21] Appl. No.: 695,415

[22] Filed: Jan. 28, 1985

Related U.S. Application Data

[63] Continuation of Ser. No. 442,203, Nov. 16, 1982, abandoned.

[30] Foreign Application Priority Data

Dec. 4, 1981 [FR] France ................ 81 22752

[51] Int. Cl.⁴ .................. G21C 1/00; G21C 7/08
[52] U.S. Cl. .................. 376/173; 376/346; 376/434; 376/435; 376/449; 376/327
[58] Field of Search .......... 376/172, 173, 434–436, 376/327, 346, 427, 449, 904, 906

[56] References Cited

U.S. PATENT DOCUMENTS

| 3,140,237 | 7/1964 | Peterson et al. | 376/173 |
|---|---|---|---|
| 3,197,376 | 7/1965 | Balent et al. | 376/904 |
| 3,211,621 | 10/1965 | Creagan | 376/173 |
| 3,335,060 | 8/1967 | Diener | 376/173 |
| 3,859,165 | 1/1975 | Radkowsky et al. | 376/173 |
| 3,960,655 | 6/1976 | Bohanan et al. | 376/435 |
| 3,971,698 | 7/1976 | Wolff et al. | 376/172 |
| 4,059,483 | 11/1977 | Anthony | 376/449 |
| 4,059,484 | 11/1977 | Bupp et al. | 376/435 |
| 4,235,669 | 11/1980 | Burgess et al. | 376/435 |

FOREIGN PATENT DOCUMENTS 1482788 8/1977 United Kingdom ........ 376/434

OTHER PUBLICATIONS

*Fast Reactor Technology*, Yevick (editor), the M.I.T. Press, 1966, pp. 677–680.

Primary Examiner—Harvey E. Behrend

[57] ABSTRACT

A complementary shutdown device for an undermoderated nuclear reactor, comprising, inside certain arrays (3) of the core, guide tubes (7) of which the cross-section is at least equal to the sum of the cross-sections of three rods (6), and which are surrounded by at least one row of fertile rods (8), and a set of shutdown rods, the cross-section of which matches the cross-section of the guide tubes (7). The shutdown is obtained by allowing the shutdown rods, containing a neutron-absorbing material, to fall into the arrays (3) of the core, in the position of maximum insertion. The invention applies, in particular, to pressurized water nuclear reactors.

4 Claims, 5 Drawing Figures

COMPLEMENTARY SHUTDOWN DEVICE FOR AN UNDERMODERATED NUCLEAR REACTOR

This application is a continuation, of application Ser. No. 442,203, filed Nov. 16, 1982, now abandoned.

BACKGROUND OF THE INVENTION

The invention relates to a complementary shutdown device for an undermoderated nuclear reactor.

A reactor of this type comprises a core consisting of fuel arrays of two different types, arranged side by side, some of them, referred to as fissile arrays, mainly containing a fissile material, whereas the others, referred to as fertile arrays, contain a material which is capable of producing fissile material under the action of neutron bombardment. The fertile arrays are generally arranged at the periphery of the core, where they collect the neutron radiation produced by the fissile arrays.

The reactor core is immersed in a moderating fluid, such as water, which generally also serves as a heat-transfer fluid. This fluid circulates in contact with the fuel elements arranged inside the arrays.

Compared with pressurized water reactors of the conventional type, which only comprise fissile arrays, undermoderated reactors have a very much lower ratio volume of moderator to volume of fissile material in the core, or moderating ratio VM/VU, whereby the energy spectrum of the neutrons is very different.

This spectrum is intermediate between that of the conventional pressurized water reactors, in which the neutrons are very slow, and that of fast reactors, in which the neutrons are not slowed down. This spectrum is said to be epithermal. A spectrum of this type makes it possible to produce fissile material from fertile material arranged, for example, at the periphery of the core.

In undermoderated reactors, a lower moderating ratio is obtained by making provision for a distribution of the fuel material in the fissile arrays which assures optimum contact with the moderator and at the same time a low volume ratio of the moderator to the fissile material.

Whether fissile or fertile, the fuel arrays consist of a prism-shaped casing made of a weakly neutron-absorbing material, such as a zirconium alloy, inside which long tubular rods, containing the fissile material or the fertile material, are arranged parallel to the height of the casing and in a uniform lattice in the cross-sections of this casing.

The spacing between the rods, inside the array, is generally maintained by spacer devices, such as wires wound in spirals around the can of the rods. This arrangement enables the heat-transfer and moderating fluid to circulate in contact with the whole surface of the rod, while permitting a very small spacing between the rods, i.e., it makes it possible to obtain a very dense lattice in which, however, the cans of the rods are never contiguous. This high-density lattice of rods of fissile material makes it possible to obtain a low moderating factor.

Inside the arrays, certain positions in the bundle are reserved for guide tubes which pass through the array over almost the whole of its height and which make it possible to introduce, into the latter, the rods of strongly neutron-absorbing material, joined together in the form of clusters forming the control rods of the reactor.

The controlled displacement of these control rods, so as to introduce the rods of absorbing material to a greater or lesser extent into the guide tubes of certain arrays, makes it possible to adjust the reactivity of the reactor core.

In the event of an emergency shutdown of the reactor, all the control rods are allowed to drop into the reactor core in the position of maximum insertion, which introduces a maximum anti-reactivity of the order of 7,000 pcm.

In conventional pressurized water reactors, which are not used to convert fertile material to fissile material, a second system makes it possible to render the core subcritical in the event of a malfunction. This is the boric acid emergency system. In fact, in these reactors, the operation of the reactor is assured simultaneously by the control rods and by the introduction of boron, in the form of boric acid, into the reactor cooling water.

In undermoderated reactors, where it is desired to have a low moderating ratio, no system for the introduction of boric acid into the cooling water is really effective.

In the event of failure of some of the control rods, there are therefore no means of rendering the core subcritical, in spite of everything, in all cases.

In fast fission nuclear reactors, a complementary shutdown device for the reactor is known, consisting of articulated absorbing elements which can be introduced into certain arrays in the event of a malfunction of the main control system of the reactor.

However, a device of this type cannot be used in the case of undermoderated reactors, the structure of which is virtually identical to that of conventional pressurized water reactors.

SUMMARY OF THE INVENTION

The object of the invention is therefore to propose a complementary shutdown device for an undermoderated nuclear reactor comprising a core immersed in a moderating fluid, which core consists of fuel arrays arranged side by side, some of them mainly containing a fissile material and the others containing a fertile material which is capable of producing fissile material under the action of neutron bombardment, the fissile or fertile material being contained inside long tubes constituting the fuel rods grouped together in the form of a bundle of rods parallel to the inside of the casing of the array, and a set of control rods consisting of rods of strongly neutron-absorbing material, of which the displacement, inside guide tubes substituted for certain fuel rods in the arrays, makes it possible to adjust the reactivity of the reactor, it being possible for this complementary shutdown device to enable absorbing elements to be introduced into the core, in the event of failure of some of the control rods, creating a sufficient anti-reactivity to compensate any failure of the control rods, irrespective of the state of the reactor core at the moment when this failure appears.

For this purpose, the complementary shutdown device comprises, inside certain arrays of the core, guide tubes of which the cross-section is at least equal to the sum of the cross-sections of three fuel rods, and which are substituted for at least three rods and are surrounded by at least one row of fertile rods, and a set of shutdown rods, the cross-section of which matches the cross-section of the guide tubes, and which mainly consist of a strongly neutron-absorbing material, for causing the shutdown of the reactor by the introduction of the rods into the guide tubes of large cross-section, in the position of maximum insertion, in the event of failure of the control rods.

BRIEF DESCRIPTION OF THE DRAWINGS

In order to provide a clear understanding of the invention, several embodiments of a complementary shutdown device, in the case of an undermoderated reactor comprising arrays of hexagonal cross-section, will now be described by way of a non-limiting example, with reference to the attached figures.

DETAILED DESCRIPTION

Figure 1:
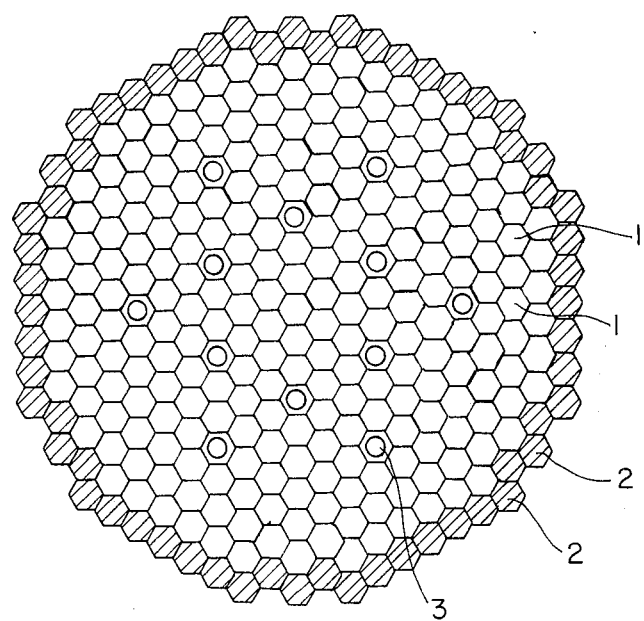
FIG. 1 is a diagrammatic view in section, through a horizontal plane, of the reactor core.

FIG. 1 shows the whole of the reactor core consisting of prism-shaped arrays of hexagonal cross-section, arranged side by side. These arrays occupy the whole height of the core and are of three different types.

The arrays 1 are fissile arrays comprising a large proportion of rods of fissile material.

The arrays 2, arranged at the periphery of the core, are fertile arrays containing a large proportion of slightly enriched uranium, natural uranium or uranium depleted in uranium 235, as the fertile material.

Finally, the arrays 3 are arrays comprising guide tubes of large cross-section, forming part of the complementary shutdown device.

These arrays 3 will be described with reference to FIGS. 2 to 4.

Figure 2:
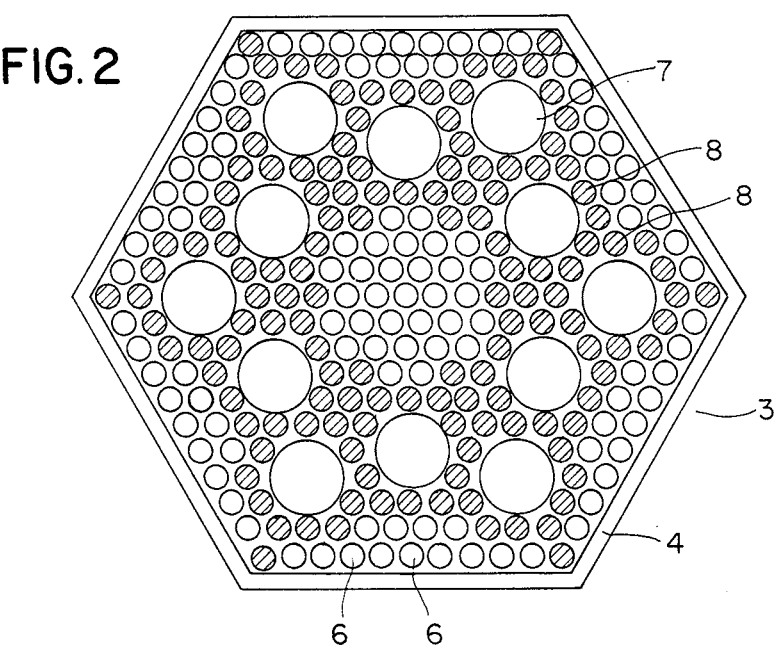
FIG. 2 is a view in section, through a horizontal plane, of a fuel array comprising guide tubes of large cross-section, in the form of a cylinder of circular cross-section.

FIG. 2 shows a first embodiment of an array 3, comprising a prism-shaped casing 4 of hexagonal cross-section, and fissile rods 6 arranged inside this casing 4 in a uniform lattice in a cross-sectional plane of the array. Fissile rods 6 have a diameter of the order of 9 mm and are arranged next to one another with a very small spacing created by virtue of a wire wound in a helix around the rod.

Twelve tubes 7 of large dimensions are substituted for the fuel rods in certain zones of the array.

Each of the tubes 7 occupies the position of seven rods, whereby the diameter of the guide tubes is of the order of 23 mm.

Each of the guide tubes is surrounded by rods 8 of fertile material, mainly containing uranium depleted in uranium 235. Fertile rods are also arranged in the corners of the array.

The presence of guide tubes of large cross-section enables absorbing elements of large volume to be introduced into the arrays 3, which makes it possible, despite a relatively reduced number of arrays comprising guide tubes for the complementary shutdown device (twelve in the case of the core shown in FIG. 1), to compensate any failure of the main control system consisting of control rods introduced into guide tubes substituted for a single rod in the arrays 1.

However, the presence of guide tubes of large cross-section in the arrays 3, which are filled with water when the complementary shutdown device is not operating, is responsible for the appearance of zones in which the moderating ratio is very high. This creates local power peaks of unacceptable amplitude in terms of the strength of the rod during operation of the reactor, because of the appearance of the nucleated boiling phenomenon. The power distribution in the array is levelled by introducing, around each of the guide tubes, at least one row of fertile rods 8, which, in the array shown in FIG. 2, represent 56% of the total number of rods in the array. This arrangement also has the advantage of increasing the production of fissile material from fertile material.

The complementary shutdown device comprises, in addition to the guide tubes 7 of large cross-section, clusters of tubes containing an absorbing material constituting special control rods, or shutdown rods, arranged above the arrays 3 and held in the high position by a safety device, for example a magnetic device, which releases the shutdown rods in the event of failure of the main system of control rods, and allows them to fall into the guide tubes 7 in the position of maximum insertion.

The anti-reactivity introduced by the twelve clusters of absorbing material arranged above the arrays 3 is of the order of 2,500 to 3,000 pcm when the clusters are introduced into the arrays 3 of the core in the position of maximum insertion.

This anti-reactivity is sufficient to compensate any predictable failure of the control rods of the main system.

Figure 3:
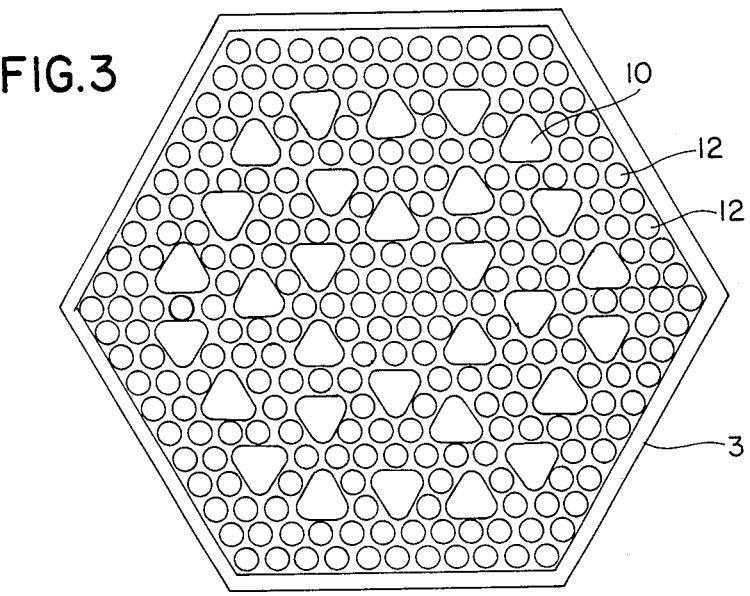
FIG. 3 is a view in section, through a horizontal plane, of a fuel array comprising guide tubes of triangular cross-section.

FIG. 3 shows a second embodiment of an array 3, in which the guide tubes 10 have triangular cross-sections with rounded corners and occupy the position of three rods 12 in the lattice.

Thirty guide tubes 10 of large cross-section for each of the arrays 3 enable a sufficient volume of absorbing material to be introduced into the arrays 3 in the event of failure of the main control system.

Figure 4:
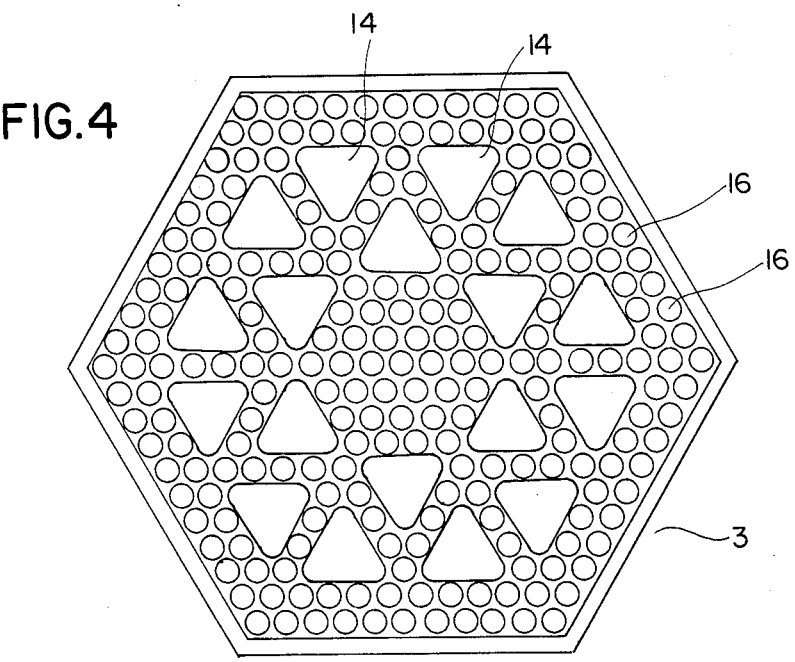
FIG. 4 is a view in section, through a horizontal plane, of a fuel array comprising guide tubes of triangular cross-section which are of different size and are arranged differently from the guide tubes of the array shown in FIG. 3.
Figure 5:
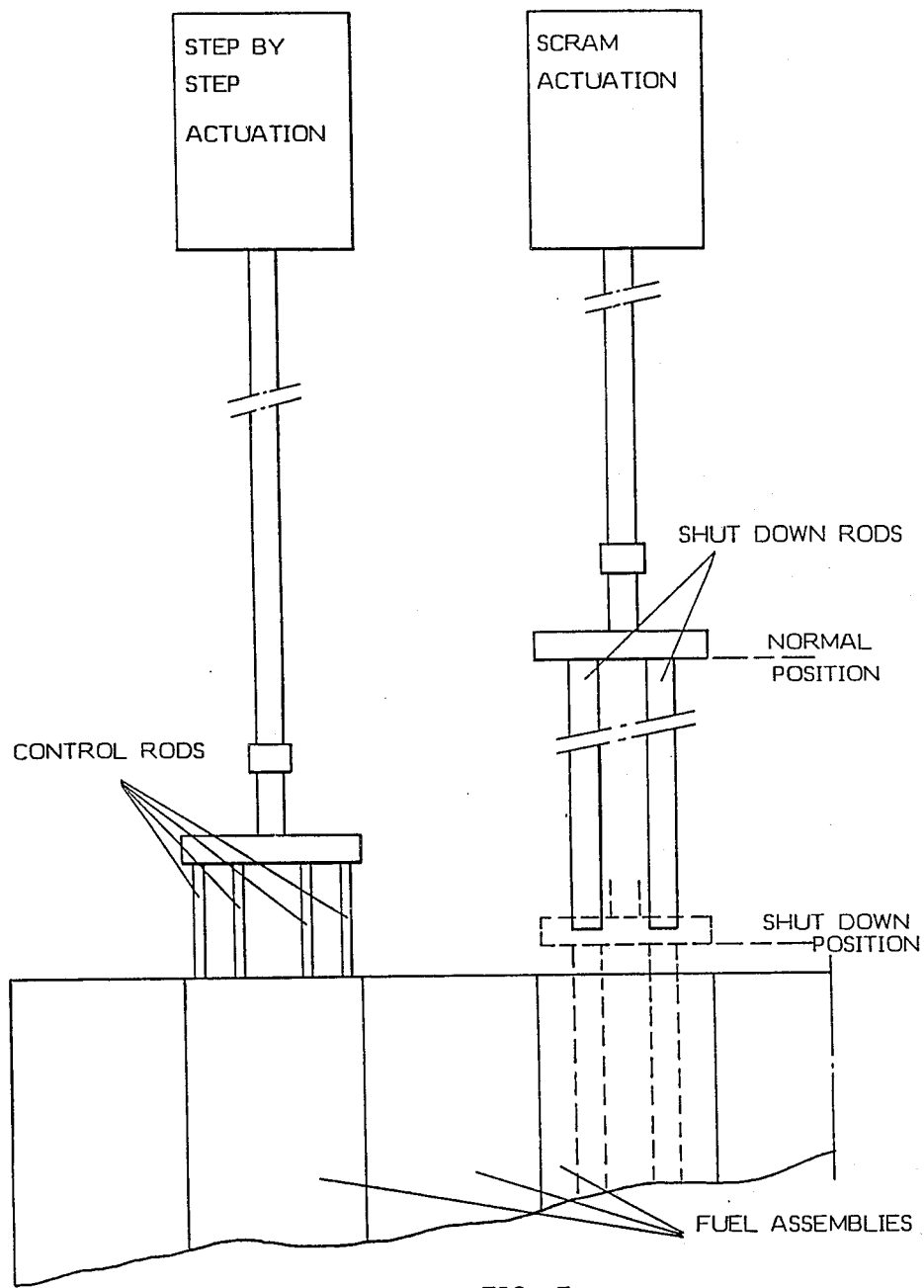

FIG. 4 shows a third embodiment of the guide tubes of the complementary shutdown device according to the invention, these guide tubes 14 having a triangular cross-section with rounded corners and occupying the position of six rods 16 in the lattice of the assembly. Eighteen guide tubes are necessary to obtain a sufficient absorbing effect in each of the arrays 3.

The rods of absorbing material, which consist, for example, of tubes filled with boron carbide, obviously have cross-sections of which the shape corresponds to the cross-sections of the guide tubes, and a slightly smaller size, enabling these absorbing rods, which are joined together in the form of clusters associated with each of the arrays, to be introduced into the large guide tubes.

It is seen that the main advantages of the device according to the invention are that it makes it possible, simply and with a high degree of operational reliability, to cause the shutdown of the reactor in the event of failure of the main control system.

In fact, the introduction of the absorbing rods into the large guide tubes can be carried out solely by cutting off the supply to a magnetic device for holding the cluster of absorbing material arranged above the array comprising the large guide tubes.

Furthermore, it is possible to use devices for holding and guiding the clusters which are completely identical to those used in PW reactors for the control rods, the whole of the device being greatly simplified, however, because the clusters of absorbing material are either in the completely raised position above the arrays, or in the position of maximum insertion, and are not used to control the reactor by precise positioning inside the array.

Moreover, the presence of fertile rods around the guide tubes makes it possible to avoid the local power peaks and to increase the amount of fissile material produced from the fertile material.

A high-efficiency complementary shutdown device can be obtained with a small number of arrays equipped with guide tubes of large cross-sections, and without substantial modification of the device used to displace the control rods.

Thus, the number and the position of the arrays comprising guide tubes of large cross-section can be different from those which have been indicated, and the shape and size of the guide tubes can vary, it being necessary, however, for these guide tubes to occupy the position of at least three rods in the lattice.

The invention is applicable not only to reactors comprising arrays of hexagonal cross-section, but also to reactors of which the arrays have a completely different shape, e.g. a square cross-section.

We claim:

1. In an undermoderated nuclear reactor comprising a core immersed in a moderating fluid,
    (a) a plurality of fissile fuel assemblies arranged side by side in upright position in said core and having a casing and a bundle of parallel elongated tubular rods grouped in said casing and containing fissile material,
    (b) a plurality of fertile fuel assemblies arranged side by side in upright position around said fissile fuel assemblies in said core and having a casing and a bundle of parallel elongated tubular rods grouped in said casing and containing fertile material,
    (c) wherein a first group of said fissile fuel assemblies includes a plurality of first guide tubes each substituted for one of said rods of fissile material and arranged to slidably receive control rods movable along said guide tubes for adjusting the reactivity of said core, and a second group of said fissile fuel assemblies including a plurality of second guide tubes having a larger cross-section than said first guide tubes, each substituted for at least three of said rods of fissile material and arranged for each receiving a shutdown rod of non-fission strongly neutron-absorbing material having a cross-section approximating that of said guide tube, each said second guide tube being adjacently surrounded by at least one layer of fertile rods, and
    (d) means for retaining said shutdown rods above and out of said core and allowing said shutdown rods to fall into said second guide tubes into a position where they exhibit maximum neutron absorption in said core.

2. The device according to claim 1, wherein said second guide tubes are in the form of cylinders of circular cross section.

3. The device according to claim 2, wherein each of said second guide tubes occupies the position of seven of the rods in a said fissile assembly.

4. The device according to claim 4, wherein said second guide tubes have triangular cross sections with rounded corners.

* * * * *